(12) United States Patent
Iguchi et al.

(10) Patent No.: US 12,345,959 B2
(45) Date of Patent: Jul. 1, 2025

(54) OPHTHALMOLOGICAL LENS

(71) Applicant: HOYA LENS THAILAND LTD., Pathumthani (TH)

(72) Inventors: Yuki Iguchi, Tokyo (JP); Shohei Matsuoka, Tokyo (JP); Hiroyuki Mukaiyama, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 746 days.

(21) Appl. No.: 17/434,570

(22) PCT Filed: Jun. 18, 2020

(86) PCT No.: PCT/JP2020/025117
§ 371 (c)(1),
(2) Date: Aug. 27, 2021

(87) PCT Pub. No.: WO2020/262568
PCT Pub. Date: Dec. 30, 2020

(65) Prior Publication Data
US 2022/0155615 A1 May 19, 2022

(30) Foreign Application Priority Data
Jun. 26, 2019 (JP) .................. 2019-118327

(51) Int. Cl.
*G02C 3/00* (2006.01)
*B29D 11/00* (2006.01)
(Continued)

(52) U.S. Cl.
CPC ........ *G02C 7/022* (2013.01); *B29D 11/00009* (2013.01); *B29D 11/00326* (2013.01);
(Continued)

(58) Field of Classification Search
CPC ........ B29D 11/00009; B29D 11/00326; B29D 11/00865; G02C 7/022; G02C 7/021; G02C 7/104; G02C 2202/24
(Continued)

(56) References Cited

U.S. PATENT DOCUMENTS 5,838,419 A 11/1998 Holland
2007/0115431 A1 5/2007 Smith, III et al.
(Continued)

FOREIGN PATENT DOCUMENTS

JP 2014504873 A 2/2014
JP 2014174482 A 9/2014
(Continued)

OTHER PUBLICATIONS

PCT/JP2020/025117, "International Search Report and Written Opinion", Feb. 11, 2020, 15 pages.
(Continued)

*Primary Examiner* — Mahidere S Sahle
(74) *Attorney, Agent, or Firm* — Oliff PLC

(57) ABSTRACT

Provided is an ophthalmological lens configured to provide a near-sightedness progression suppression effect using a monochromatic aberration of a pencil that is a bundle of rays passing through the ophthalmological lens and passing through a pupil, the ophthalmological lens including a wavelength filter for attenuating light of a long wavelength longer than a set dominant wavelength, and technology related thereto.

8 Claims, 6 Drawing Sheets

(51) Int. Cl.
*G02C 7/02* (2006.01)
*G02C 7/10* (2006.01)

(52) U.S. Cl.
CPC ........ *B29D 11/00865* (2013.01); *G02C 7/021* (2013.01); *G02C 7/104* (2013.01); *G02C 2202/24* (2013.01)

(58) Field of Classification Search
USPC ........................................ 351/159.65, 159.78
See application file for complete search history.

(56) References Cited

U.S. PATENT DOCUMENTS

| | | |
|---|---|---|
| 2013/0250235 A1 | 9/2013 | Foulds et al. |
| 2017/0131567 A1 | 5/2017 | To et al. |
| 2018/0081199 A1 | 3/2018 | Jarrousse et al. |
| 2019/0033619 A1 | 1/2019 | Neitz et al. |
| 2019/0212583 A1* | 7/2019 | Wu ........................ G02C 7/105 |

FOREIGN PATENT DOCUMENTS

| | | |
|---|---|---|
| WO | 9731286 A1 | 8/1997 |
| WO | 2012044256 A1 | 4/2012 |
| WO | 2012097213 A2 | 7/2012 |
| WO | 2018076057 A1 | 5/2018 |

OTHER PUBLICATIONS

JP2020-103535, "Notice of Reasons for Refusal" with Machine Translation, Jul. 30, 2024, 16 pages.

\* cited by examiner

[Fig. 1A]
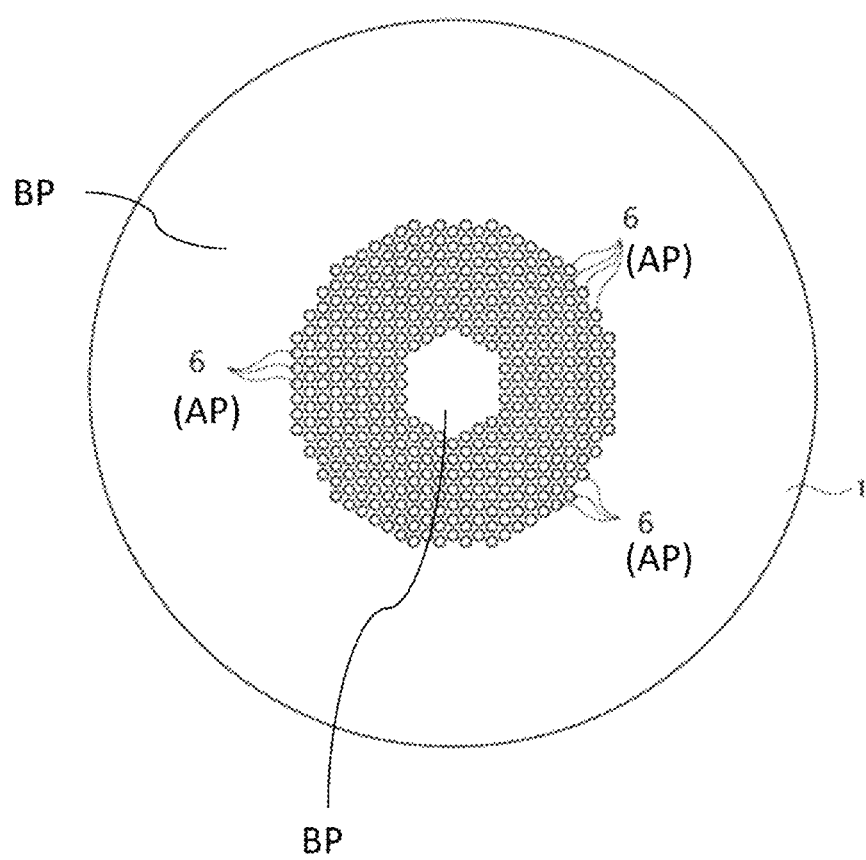

[Fig. 1B]
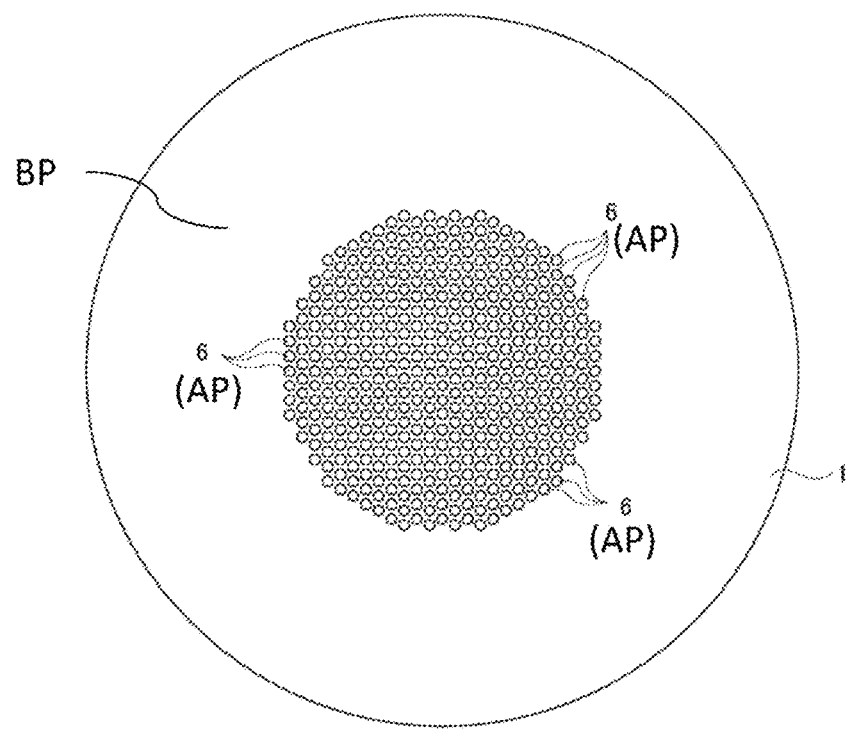

[Fig. 1C]
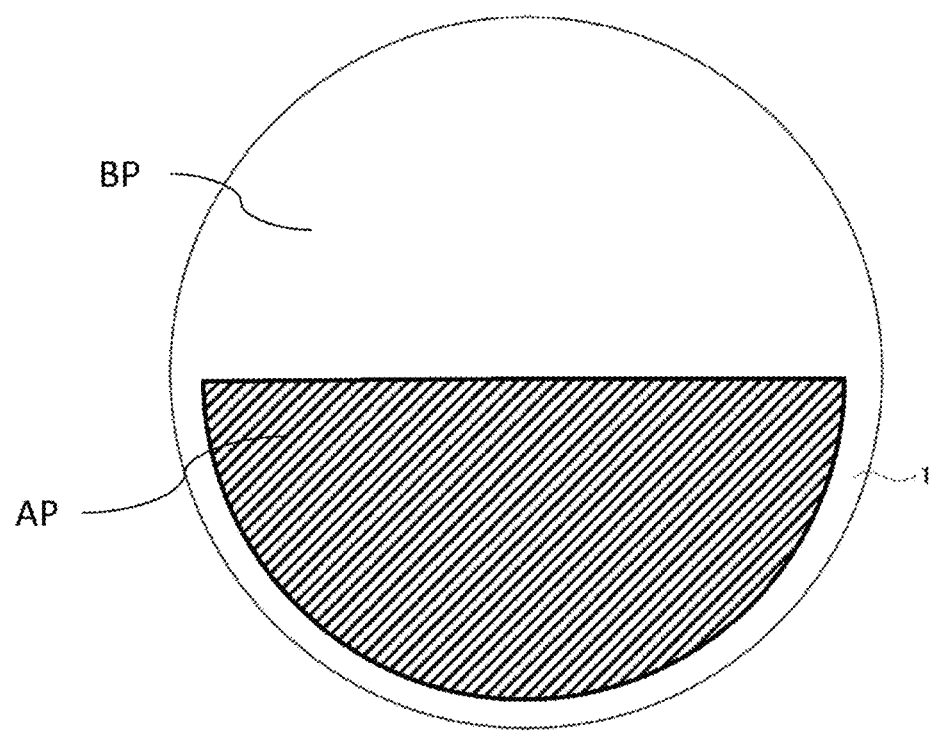

[Fig. 1D]
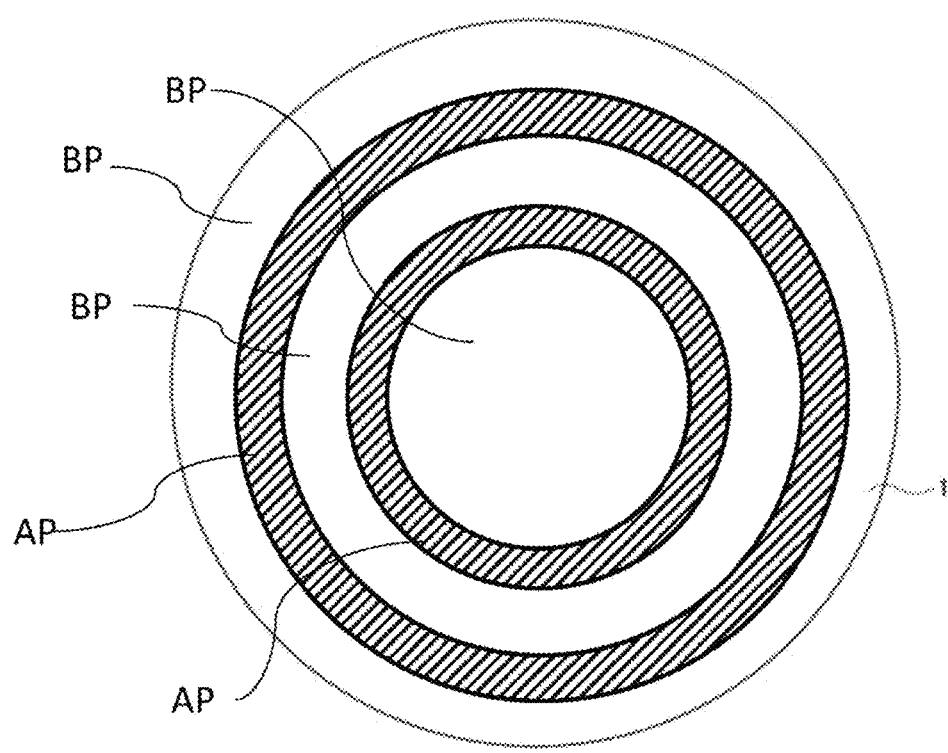

[Fig. 2]
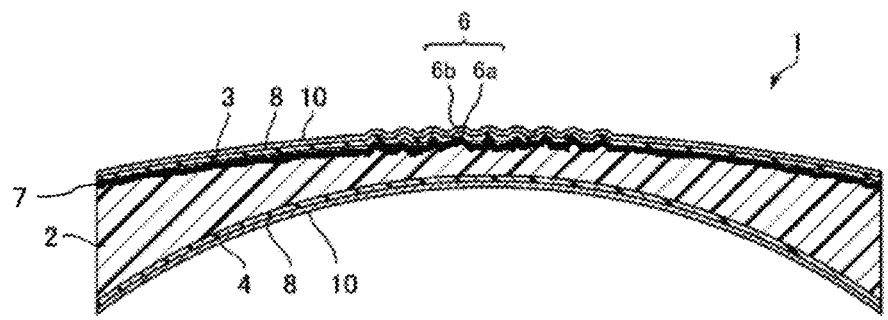
[Fig. 3]
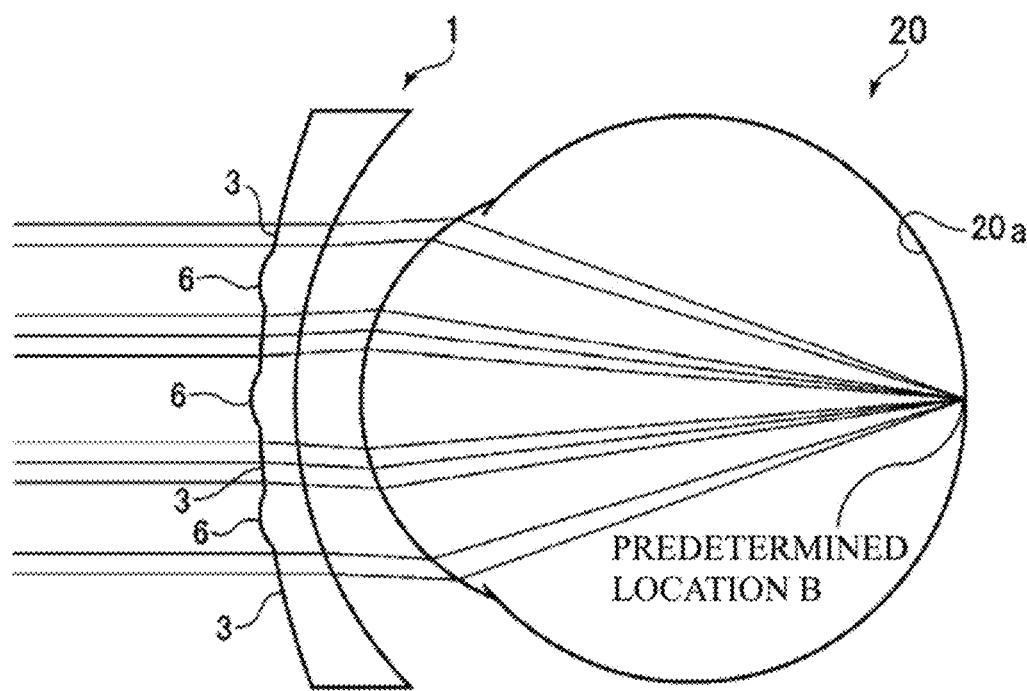

[Fig. 4]
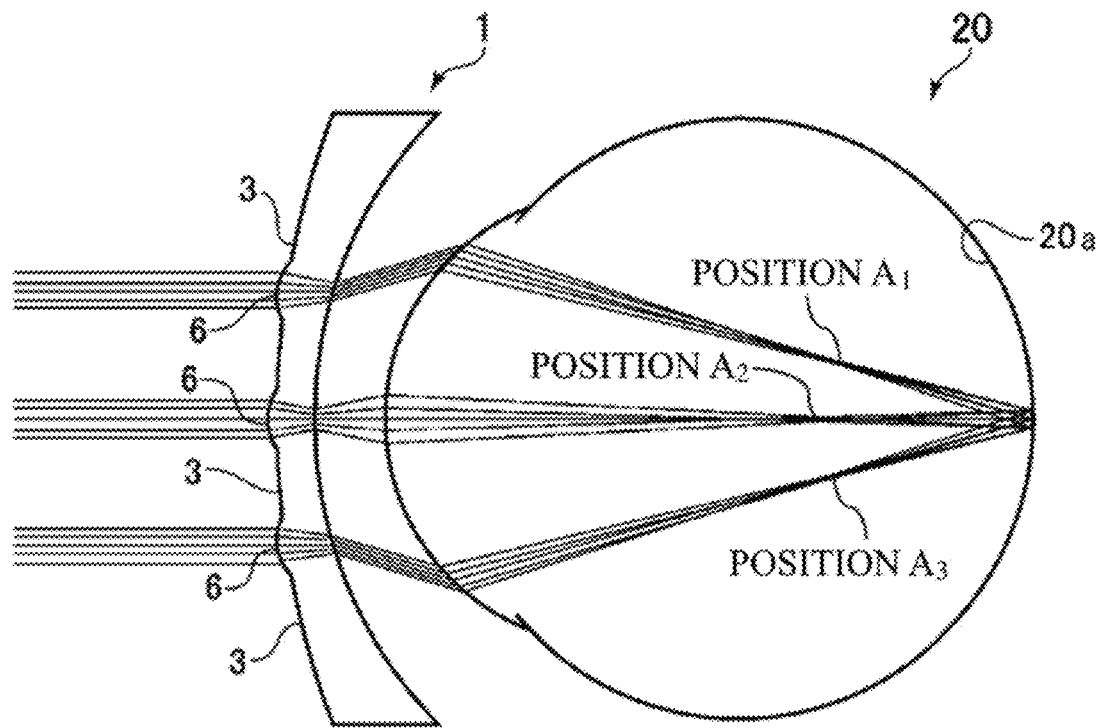
[Fig. 5]
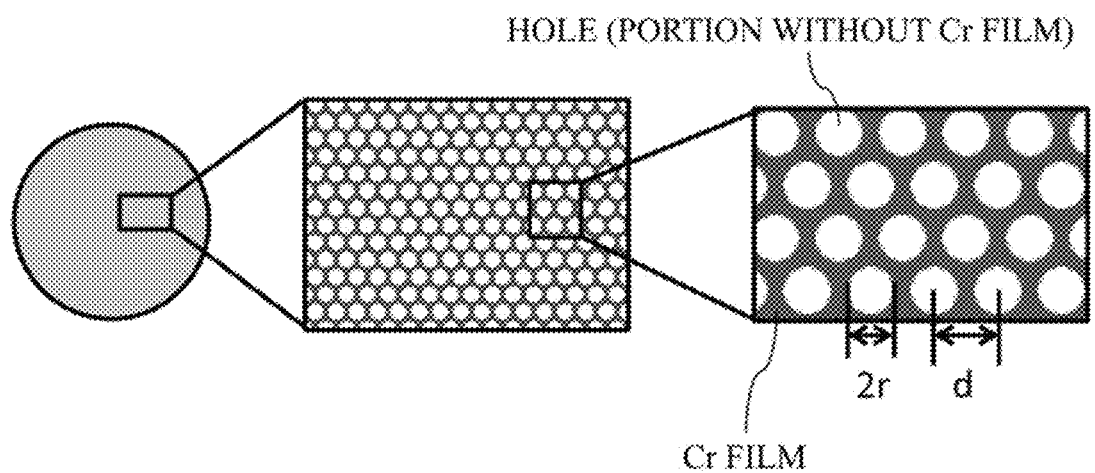

OPHTHALMOLOGICAL LENS

CROSS-REFERENCE TO RELATED APPLICATIONS

This application is the National Stage of International Application No. PCT/JP2020/025117 filed Jun. 18, 2020, which claims priority to Japanese Patent Application No. 2019-118327, filed Jun. 26, 2019, and the contents of which is hereby incorporated by reference.

TECHNICAL FIELD

The present disclosure relates to an ophthalmological lens.

BACKGROUND ART

Accompanying an increase in the near-sighted population, the severely near-sighted population has also increased. It is well-known that severe near-sightedness may lead to loss of eyesight. For this reason, the increase in severe near-sightedness is a serious social issue, and there has been broad demand for a treatment method that suppresses the progression of near-sightedness.

Several methods for suppressing the progression of near-sightedness to severe near-sightedness have been proposed. One method for suppressing the progression of optical nearsightedness is a method in which an ophthalmological lens such as glasses or a contact lens (a soft contact lens, orthokeratology) is used.

CITATION LIST

Patent Literature

US 2017/131567A is an example of related art.

SUMMARY OF THE DISCLOSURE

A first aspect of the present disclosure is
an ophthalmological lens configured to provide a near-sightedness progression suppression effect using a monochromatic aberration of a pencil that is a bundle of rays passing through the ophthalmological lens and passing through a pupil,
the ophthalmological lens including a wavelength filter for attenuating light of a long wavelength longer than a set dominant wavelength.
A second aspect of the present disclosure is an aspect according to the first aspect, including:
a predetermined location AP; and a base portion BP that is a portion adjacent to the predetermined location AP, in which light is focused on a retina and light is focused on a location other than the retina due to the predetermined location AP and the base portion BP.
A third aspect of the present disclosure is an aspect according to the second aspect, in which
the predetermined location AP satisfies at least one of the following.
(1) The predetermined location AP includes a convex portion region that protrudes from a base portion BP of at least one of an eyeball-side surface and an object-side surface of the ophthalmological lens so as to focus a portion of the pencil on the overfocus side relative to the retina.
(2) The predetermined location AP includes a diffraction structure on at least one of the eyeball-side surface and the object-side surface of the ophthalmological lens so as to focus a portion of the pencil on the overfocus side relative to the retina using a diffractive action of the predetermined location AP.
(3) The predetermined location AP is provided on at least one of the eyeball-side surface and the object-side surface of the ophthalmological lens, and includes a different refractive index material region having a refractive index different from the refractive index of the base portion BP, so as to focus a portion of the pencil on the overfocus side relative to the retina using reciprocal actions of the predetermined location AP and the base portion BP.
A fourth aspect of the present disclosure is an aspect according to the second or third aspect, in which
a high-order monochromatic aberration of a fourth order or higher is added to a pencil passing through a range with a diameter of 4 mm that includes both the predetermined location AP and the base portion BP.
A fifth aspect of the present disclosure is an aspect according to the third aspect, in which
the wavelength filter is provided on at least one of the convex portion region, the diffraction structure, and the different refractive index material region.
A sixth aspect of the present disclosure is an aspect according to any one of the first to fifth aspects, in which
the set dominant wavelength is one value in a range of 500 to 585 nm.
A seventh aspect of the present disclosure is an aspect according to any one of the first to sixth aspects, in which
the set dominant wavelength is one value in a range of 532 to 575 nm.
An eighth aspect of the present disclosure is an aspect according to any one of the first to seventh aspects, in which
the set dominant wavelength is one value in a range of 564 to 570 nm.
A ninth aspect of the present disclosure is
an ophthalmological lens configured to provide a near-sightedness progression suppression effect using a monochromatic aberration of a pencil that is a bundle of rays passing through the ophthalmological lens and passing through a pupil, the ophthalmological lens having a spectral transmittance set such that an average value of a defocus amount (Diopter)×an amount of light focused on an underfocus side relative to a retina is smaller than an average value of a defocus amount (Diopter)×an amount of light focused on an overfocus side relative to the retina.
A tenth aspect of the present disclosure is
an ophthalmological lens configured to provide a far-sightedness progression suppression effect using a monochromatic aberration of a pencil that is a bundle of rays passing through the ophthalmological lens and passing through a pupil,
the ophthalmological lens including a wavelength filter for attenuating light of a short wavelength shorter than a set dominant wavelength.
An eleventh aspect of the present disclosure is an aspect according to any one of the first to tenth aspects, in which
the ophthalmological lens is an eyeglass lens.

BRIEF DESCRIPTION OF THE DRAWINGS

FIG. 1A is a schematic front view of an eyeglass lens in a case in which predetermined locations AP are convex portion regions and no convex portion region is provided in the center.

FIG. 1B is a schematic front view of an eyeglass lens in a case in which predetermined locations AP are convex portion regions and convex portion regions are provided also in the center.

FIG. 1C is a schematic front view of an eyeglass lens in a case in which only one predetermined location AP is provided.

FIG. 1D is a schematic front view of an eyeglass lens in a case in which predetermined locations AP are provided in the form of rings.

FIG. 2 is a cross-sectional view showing an exemplary configuration of the eyeglass lens shown in FIG. 1B.

FIG. 3 is a schematic cross-sectional view (1) showing a path of light passing through the eyeglass lens shown in FIG. 1B.

FIG. 4 is a schematic cross-sectional view (2) showing a path of light passing through the eyeglass lens shown in FIG. 1B.

FIG. 5 shows a schematic front view and a partially enlarged view of an eyeglass lens according to a modified example including a Cr film provided with holes in a dot pattern.

EMBODIMENTS OF THE DISCLOSURE

US 2017/131567A discloses an eyeglass lens that exhibits an effect (hereinafter referred to also as a "near-sightedness progression suppression effect") of suppressing the progression of a refractive error such as near-sightedness by adding a later-described monochromatic aberration. This eyeglass lens is also referred to as a near-sightedness progression suppression lens. Specifically, for example, a spherical minute convex portion with a diameter of about 1 mm is formed on a convex surface, which is the object-side surface of the eyeglass lens.

With an eyeglass lens, normally, rays that have entered from the object-side surface are emitted from the eyeball-side surface and thus are focused on the wearer's retina (in the present specification, a predetermined position B). That is, the rays are focused on the retina by a portion of the eyeglass lens according to US 2017/131567A, which has a shape that corresponds to a prescribed strength. The position B is referred to as focal point position B.

On the other hand, as for light that has passed through the minute convex portion on the eyeglass lens according to US 2017/131567A, rays that are incident on the ophthalmological lens are focused at multiple positions A on the overfocus side in the optical axis direction relative to the predetermined position B. The position A is referred to as a focal point position A. The progression of near-sightedness is suppressed using the above-described monochromatic aberration that is provided by the minute convex portion.

In the present specification, "overfocus side" refers to a direction of moving in the optical axis direction toward the object that is to be viewed, with reference to the retina, and "underfocus side" refers to a direction opposite to the overfocus side, and a direction of moving in the optical axis direction away from the object that is to be viewed, with reference to the retina. If the optical strength is excessively positive, light is focused on the overfocus side, and if the optical strength is insufficient, light is focused on the underfocus side.

In an optical system of an eye (cornea, lens, etc.), the refractive index differs depending on the wavelength of light. For this reason, defocusing on the retina occurs at each wavelength due to a longitudinal chromatic aberration. Defocusing at each wavelength means that a pencil that is a bundle of rays passing through the pupil is focused relatively in front of the retina at short wavelengths, and is focused relatively behind the retina at long wavelengths. (In this disclosure, the term "pupil" is an optical term that means "the entrance pupil of the eye.") This phenomenon can contribute to the progression of near-sightedness or to the suppression of the progression of near-sightedness. In particular, a component of light that is focused on the underfocus side relative to the retina in the defocusing at each wavelength that occurs due to a longitudinal chromatic aberration can cause near-sightedness to progress.

Filtering the defocused component caused by a longitudinal chromatic aberration using a wavelength filter and controlling the light amount can contribute to suppressing the progression of near-sightedness. However, there is a problem in that if the light amount is unduly attenuated, the object color recognition ability of a person will be significantly impaired. Furthermore, there is also a problem with eyeglass lenses in that an unpreferable tint appears in the lens itself, impairing the aesthetics. In view of this, consideration has been given to attenuating the light amount at a suitable wavelength at which color recognition and aesthetics will not be impaired, while continuing to contribute to suppressing the progression of near-sightedness.

Note that in US 2017/131567A, it is disclosed that a near-sightedness progression suppression effect is exhibited by the minute convex portion. On the other hand, by making the minute convex portion into a minute concave portion, it is expected that a far-sightedness progression suppression effect will be exhibited due to mechanisms that are the inverse of the near-sightedness progression mechanism and the near-sightedness progression suppression mechanism disclosed in US 2017/131567A. Also, the component of the light that is focused on the overfocus side relative to the retina in the defocusing at each wavelength that occurs due to a longitudinal chromatic aberration can maintain or advance far-sightedness, and the components of the light that are focused on the underfocus side can suppress far-sightedness.

One embodiment of the present disclosure aims to enable control of an amount of light that is defocused at each wavelength due to a longitudinal chromatic aberration, and to not cause impairment of an effect of suppressing progression of near-sightedness or far-sightedness.

One aspect of the present disclosure was obtained based on the following technical ideas.

Realizing a near-sightedness progression suppression effect using a monochromatic aberration in a lens.

Using a wavelength filter to reduce contribution to the near-sightedness progression suppression effect using a longitudinal chromatic aberration that occurs under white light when using the lens. In this case, the wavelength filter is provided with a function of attenuating light with a long wavelength longer than a set dominant wavelength.

According to an embodiment of the present disclosure, it is possible to control the amount of light that is defocused at each wavelength due to a longitudinal chromatic aberration, and an effect of suppressing the progression of near-sightedness or far-sightedness is not impaired.

Hereinafter, an aspect of the present disclosure will be described. The description below is exemplary, and the present disclosure is not limited to the aspects that are described as examples. Note that in the present specification, when describing a range of values, "to" indicates being a predetermined numerical value or more and a predetermined numerical value or less.

Eyeglass Lens According to an Aspect of the Present Disclosure

An eyeglass lens according to an aspect of the present disclosure is a near-sightedness progression suppression lens, which may be based on an eyeglass lens according to US 2017/131567A. A specific configuration thereof is as follows.

"An ophthalmological lens configured to provide a near-sightedness progression suppression effect using a monochromatic aberration of a pencil that is a bundle of rays passing through the ophthalmological lens and passing through a pupil, the ophthalmological lens including a wavelength filter for attenuating light of a long wavelength longer than a set dominant wavelength."

The type of ophthalmological lens upon which this configuration is based is not particularly limited to an aspect, as long as the ophthalmological lens has a property of near-sightedness progression suppression (a property of far-sightedness progression suppression in the case of a later-described modified example). Examples of the ophthalmological lens include an eyeglass lens or a contact lens. In an aspect of the present disclosure, an eyeglass lens is illustrated as an example.

An eyeglass lens has an object-side surface and an eyeball-side surface. The "object-side surface" is the surface that is located on the object side when a wearer wears the glasses including the eyeglass lens, and is a so-called outer surface. The "eyeball-side surface" is the surface that is located on the opposite side, that is, the eyeball side, when the wearer wears the glasses including the eyeglass lens, and is a so-called inner surface. In an aspect of the present disclosure, the object-side surface is a convex surface, and the eyeball-side surface is a concave surface. That is, the eyeglass lens according to an aspect of the present disclosure is a meniscus lens.

In the ophthalmological lens according to one aspect of the present disclosure, pencils, which are bundles of rays passing through the ophthalmological lens and passing through the pupil, are focused at at least two locations. "Monochromatic aberration" indicates an aberration other than a "chromatic aberration (including longitudinal chromatic aberration)", and indicates that light is not focused at one point at a certain wavelength.

In the ophthalmological lens according to an aspect of the present disclosure, a portion of the pencil, which is a bundle of rays passing through the ophthalmological lens and passing through pupil is focused on the retina. That is, the prescription of the eyeglass lens is realized. Hereinafter, a pencil that is a bundle of rays passing through the pupil will simply be referred to as a pencil.

On the other hand, the other portion of the pencil is focused toward the overfocus side relative to the retina (as shown, for example, FIG. 4), and thus a near-sightedness progression suppression effect is exhibited. This is also referred to as "providing a near-sightedness progression suppression effect using a monochromatic aberration".

In the present specification, a case is illustrated in which a portion of the pencil is focused on the retina, another portion is focused toward the overfocus side relative to the retina, and the near-sightedness progression suppression effect is exhibited.

Also, the ophthalmological lens according to an aspect of the present disclosure includes a wavelength filter that attenuates light of a long wavelength longer than the set dominant wavelength. According to this configuration, the component of the light that occurs due to a longitudinal chromatic aberration, that is, the component of the light that is focused toward the underfocus side relative to the retina, is reduced.

The "set dominant wavelength" refers to a wavelength (green-color wavelength) that is higher than 534 nm, the wavelength at which the sensitivity of M cone cells is the highest. Note that this sensitivity changes according to whether it is bright or dark. In view of this, the set dominant wavelength may have a value in the range of from 500 to 585 nm. It may be desired for this range to be from 515 to 550 nm, or even from 532 to 575 nm, and a value in this range may be used. In one example, the optimal range for the value of the set dominant wavelength is from 564 to 570 nm, in which the sensitivity of the M cone cells falls below the sensitivity of the L cone cells.

"Attenuating light of a long wavelength longer than the set dominant wavelength" means lowering the average transmittance of light of a wavelength (e.g., under optimal conditions, a long wavelength that exceeds 564 to 570 nm) that is longer than the above-described dominant wavelength. The wavelength filter may be implemented in a variety of different forms to have this property of attenuation. Although there is also no particular limitation to the upper limit of the long wavelength, the upper limit may be 780 nm or 830 nm.

Note that it can also be said that attenuating the light of a long wavelength using the wavelength filter is controlling the spectral transmittance indicating the transmittance of each wavelength.

That is, with the ophthalmological lens according to an aspect of the present disclosure, the near-sightedness suppression effect is provided by focusing a portion of the pencil that enters the ophthalmological lens on the overfocus side relative to the retina using a monochromatic aberration. In addition to this, the component of the light that is focused on the underfocus side relative to the retina among the components of the light that occur due to a longitudinal chromatic aberration can be reduced. As a result, the effect of suppressing the progression of near-sightedness is not impaired. Note that "focusing" is not necessarily limited to focusing in a narrow sense, in which substantially non-aberrant light is collected at one point, and also encompasses focusing in a broad sense, such as a position at which a concentration of flare light in a diffractive lens is high.

Details of Eyeglass Lens According to One Aspect of the Present Disclosure

Hereinafter, further specific examples, preferable examples, and modified examples of an aspect of the present disclosure will be described.

Although there is no particular limitation on the eyeglass lens according to an aspect of the present disclosure, a single-focus lens is given as an example thereof. The eyeglass lens according to an aspect of the present disclosure is a single-focus lens that corresponds to an object distance of an intermediate distance (1 m to 40 cm) or a near distance (40 cm to 10 cm). Of course, the technical idea of the present disclosure can be applied also to a single-focus lens corresponding to an infinite distance, but the single-focus lens corresponding to an intermediate or near distance is illustrated as one aspect of the present disclosure.

Note that the eyeglass lens according to an aspect of the present disclosure may also be a bifocal lens with two focal points, or a trifocal lens with three focal points. It is also possible to use a progressive refraction lens that includes a near portion corresponding to the near distance, a far portion that corresponds to a distance that is farther than the near distance, and an intermediate portion that has a progressive action connecting the near portion and the far portion.

In the ophthalmological lens, it is preferable to include a predetermined location AP that is a portion for focusing a portion of a pencil that enters the ophthalmological lens on the overfocus side relative to the retina using a monochromatic aberration to provide a near-sightedness progression suppression effect, and a base portion BP that is a portion that is adjacent to the predetermined location AP and focuses a portion of the pencil that enters the ophthalmological lens on the retina.

The base portion BP is a portion that has a shape and a refractive index for realizing a prescription, as with a conventional ophthalmological lens. Note that the base portion BP is adjacent to the predetermined location AP and may also surround the predetermined location AP. On the other hand, if the predetermined location AP is adjacent to another predetermined location AP', then the base portion BP may be adjacent to the predetermined location AP without surrounding the predetermined position AP.

Also, it may be desired to implement the predetermined location AP as a portion to which an optical path is added in order to focus the pencil passing through the predetermined location AP on the overfocus side relative to the retina when compared to the base portion BP.

"Adding an optical path" may be implemented, for example, by at least one of the following.

Increasing the distance of the lens portion through which a ray passes at the predetermined location AP compared to the base portion BP (e.g., forming a convex portion region that protrudes from the base portion BP).

Changing the refractive index of the predetermined location AP compared to the base portion BP.

In other words, this "addition of an optical path" indicates adding a high-order monochromatic aberration of a fourth order or higher to the pencil passing through a range with a diameter of 4 mm that includes both the predetermined location AP and the base portion BP in the ophthalmological lens.

"Adding a high-order monochromatic aberration of a fourth order or higher to the light emitted from the ophthalmological lens" means that the intermediate portion of a simple progressive refraction lens or a boundary between the base portion and a small lens portion of a simple bifocal lens is distinguished from the predetermined location AP. To give an overall description, if there is no predetermined location AP, only a low-order aberration of a second order or less will be added. On the other hand, due to a later-described convex portion region, concavo-convex portion region, or different refractive index material region being present, a high-order chromatic aberration of a fourth order or higher is added.

In the present specification, the term "cross section" indicates a cross section of the lens which is taken in a plane that includes the optical axis of the lens. In at least a cross section taken in one such plane, a high-order monochromatic aberration of a fourth order or higher is added to the light emitted from the ophthalmological lens. It may be desired that in the cross sections taken in all such planes, a high-order monochromatic aberration of a fourth order or higher is added to the light emitted from the ophthalmological lens.

In one aspect of the present disclosure, the portion of the pencil that would have been focused on the retina by the base portion BP if there were no predetermined location AP is focused on the overfocus side relative to the retina. Note that otherwise, the portion of the pencil becomes stray light without being focused on either the retina or the overfocus side.

One feature of one aspect of the present disclosure lies in using the predetermined location AP to shift the focusing position of the pencil that would have been focused on the retina away from the retina using the base portion BP. The changing of the focusing position is also referred to as "defocusing". The portion of the pencil that has passed through the predetermined location AP and is focused on the overfocus side relative to the retina exhibits a near-sightedness progression suppression effect.

On the other hand, the portion of the pencil that has passed through the ophthalmological lens and is focused on the underfocus side inhibits the near-sightedness progression suppression effect. In view of this, in one aspect of the present disclosure, the light that is focused toward the underfocus side relative to the retina is attenuated due to a later-described wavelength filter being provided. Accordingly, the risk that the near-sightedness progression suppression effect will be inhibited is reduced.

That is, combining the following two configurations is one feature of an aspect of the present disclosure:

Defocusing toward the overfocus side relative to the retina is caused by a predetermined location AP provided on the ophthalmological lens, and The light that would have been focused toward the underfocus side relative to the retina due to a longitudinal chromatic aberration (i.e., the light that inhibits the near-sightedness progression suppression effect) is attenuated.

It may be desired for the predetermined location AP to satisfy at least one of the following three conditions.

(1) The predetermined location AP includes a convex portion region that protrudes from a base portion BP of at least one of the eyeball-side surface and the object-side surface of the ophthalmological lens so as to focus a portion of the pencil on the overfocus side relative to the retina.

(2) The predetermined location AP includes a diffraction structure on at least one of the eyeball-side surface and the object-side surface of the ophthalmological lens so as to focus a portion of the pencil toward the overfocus side relative to the retina using a diffractive action of the predetermined location AP.

(3) The predetermined location AP is provided on at least one of the eyeball-side surface and the object-side surface of the ophthalmological lens, and includes a different refractive index material region having a refractive index different from the refractive index of the base portion BP, so as to focus a portion of the pencil on the overfocus side relative to the retina using reciprocal actions of the predetermined location AP and the base portion BP.

Condition (1) encompasses being provided at the predetermined location AP such that multiple (e.g., 100 or more, preferably 500 or more, and more preferably 1000 or more) convex portion regions are surrounded by the base portion BP (e.g., similar to an arrangement of minute convex portions provided on an eyeglass lens as described in US 2017/131567A). This aspect is mainly described in the present specification.

On the other hand, a case in which one, two, or three convex portion regions (also includes a small lens of a bifocal lens or the like) are provided as the predetermined locations AP is also included in condition (1). A case in which the convex portion region has a circular ring shape with respect to the lens center is also included. The lens center in this context indicates the geometric center, the centering center, or the optical center of the eyeglass lens. In the present aspect, a case of using the centering center is illustrated as an example.

Condition (2) includes a case in which the region (phase diffraction structure) in which the one cross-section of the lens is a saw blade shape or a convexo-concave shape is provided at the predetermined location AP, as in a diffraction lens or a Fresnel lens. Also, the convexo-concave shape may also be a periodic structure, or a non-periodic structure such as surface roughness formed in embossing. Furthermore, it is also possible to use a region in which a pattern is formed in a circular ring shape that surrounds the lens center. Note that condition (2) also includes a case in which one, two, or three convexo-concave regions are provided as the predetermined location AP. Focusing performed using the diffractive action can be performed using the above-described phase diffraction structure, as well as an amplitude diffraction structure that causes a diffractive action using the difference in transmittance between a light-blocking portion and a transmissive portion.

In conditions (1) and (2) above, a high-order monochromatic aberration of a fourth order or higher is added to the light emitted from the ophthalmological lens due to the "shape" of a cross section of the ophthalmological lens or the difference in the transmittance of the ophthalmological lens.

Note that the convex portion region or the convexo-concave region may also be formed on the lens base material itself, or the convex portion region or the convexo-concave region may also be formed on a hard coat film or the like formed on the lens base material.

Other than this, with respect to one lens base material, a film may be formed on the predetermined location AP, or a film may be formed at a location other than the predetermined location AP (e.g., the entire base portion BP). Alternatively, a film a may be formed at the predetermined location AP and a film b different from the film b may be formed at a location other than the predetermined location AP.

With the predetermined location AP in condition (3), the shapes of the eyeball-side surface and the object-side surface of the eyeglass lens are shapes similar to that of the base portion BP. On the other hand, when viewed in a cross section, the refractive index of the predetermined location AP is different from that of the base portion BP.

Specific examples include a case in which an optical path for when a ray passes through the eyeglass lens is changed by changing the raw material of at least a portion located in a region from the object-side surface to the eyeball-side surface at the predetermined location AP in the lens base material of the eyeglass lens from the raw material of the base portion BP.

Other than this, with respect to one lens base material, a film may be formed at the predetermined location AP, or a film may be formed at a location other than the predetermined location AP (e.g., the entire base portion BP). Alternatively, a film a may be formed at the predetermined location AP and a film b that is different from the film b may be formed at a location other than the predetermined location AP.

Regarding the predetermined location AP in condition (3), similarly to condition (1), the predetermined location AP may also be set so as to be surrounded by the base portion BP (e.g., as shown in FIGS. 1A-1D), and the predetermined location AP may also be set to a circular ring shape with respect to the lens center (e.g., as shown in FIG. 1D). Note that condition (3) also includes a case in which one, two, or three different refractive index material regions are provided at the predetermined location AP. In condition (3), the optical path length is increased or reduced using the different refractive index material of a cross section of the ophthalmological lens, and the wave surface is disrupted. As a result, a high-order monochromatic aberration of a fourth order or higher is added to the light emitted from the ophthalmological lens.

Note that conditions (1) to (3) above may also be combined as appropriate. That is, a case in which the predetermined location AP is, for example, a combination of a convex portion region and a phase diffraction structure is also possible. Therefore, the expression "the predetermined location AP includes a convex portion region" is used.

FIGS. 1A to 1D are front schematic views of the eyeglass lens, showing the positions of the predetermined locations AP in conditions (1) to (3) above. In each of FIGS. 1A to 1D, for convenience of description, a circular lens is shown instead of an eyeglass lens that has been fit to a frame.

FIG. 1A is a schematic front view of the eyeglass lens in a case where the predetermined locations AP are convex portion regions and no convex portion region is provided in the center.

FIG. 1B is a schematic front view of the eyeglass lens in a case in which the predetermined locations AP are convex portion regions and the convex portion regions are provided also in the center.

FIG. 1C is a schematic front view of the eyeglass lens in a case in which only one predetermined location AP is provided.

FIG. 1D is a schematic front view of the eyeglass lens in a case in which the predetermined locations AP are formed in ring shapes.

Incidentally, the pencil described above may be thought of as light that enters a pupil. This means that a portion of the "light that enters the pupil", when this "light" is the pencil that passes through the ophthalmological lens, is focused on the retina while another portion is focused on the overfocus side relative to the retina. For this purpose the ophthalmological lens (e.g., eyeglass lens) may be provided with a form that is so minute as to split the focus positions of light of the same wavelength with respect to a number of pencils small enough to enter the pupil.

Relating to this, regarding "a portion of the pencil that passes through the ophthalmological lens is focused on the retina" and "another portion of the pencil that passes through the ophthalmological lens is focused on the overfocus side relative to the retina" in an aspect of the present disclosure, even when using light of the same wavelength, light is focused on the retina by the base portion BP, and light is focused on the overfocus side relative to the retina by the predetermined location AP. Note that although there is no particular limitation on the ratio of the amount of light that is focused on the overfocus side to the amount of light that is focused on the retina, the ratio is preferably set within a range of 1:10 to 1:1 so as to suitably exhibit the near-sightedness progression suppression effect. Note that the amount of light can be kept track of by using a known ray tracing method.

Note that it may be desired for all light, other than the light that is focused on the overfocus side relative to the retina, to be focused on the retina. For this reason, the light that originally would have been focused on the retina, among the light of the predetermined wavelength that passes through the ophthalmological lens, can be focused on the overfocus side relative to the retina by causing the light to pass through the predetermined locations AP, which are portions of the ophthalmological lens.

On the other hand, it is also possible for some of the light to become stray light without being focused, and for some of the light to be focused on the underfocus side relative to the retina. However, in this case as well, a desired progression suppression may be achieved, as long as the amount of light focused on the overfocus side is suitable. For example, it may be desired for the total amount of light other than the light focused on the overfocus side and the light focused on the retina, as a percentage of the total of the amount of light focused on the overfocus side and the amount of light focused on the retina, to be 10% or less.

The exact pupil diameter varies among individuals, but is normally 4 mm. For this reason, it may be desired to add a high-order monochromatic aberration of a fourth order or higher to the pencil passing through a range with a diameter of 4 mm that includes both the predetermined location AP and the base portion BP in a plan view of the ophthalmological lens (in a view facing the object-side surface). When the conditions (1), (2), and/or (3) above are satisfied, it may be desired to add the condition of a cross section of the ophthalmological lens in a range with a diameter of 4 mm that includes the predetermined location AP. The same may be applied to the other examples described above, and it may be desired to consider the example described above in a range with a diameter of 4 mm that includes the predetermined locations AP.

The wavelength filter may be implemented in a variety of forms to have the property that light of a long wavelength longer than the set dominant wavelength is attenuated. For example, if the set dominant wavelength is 534 nm, it may be desired for the wavelength filter to have a property of attenuating light with a wavelength of 564 nm or more, which is the red-color wavelength. Note that although there is no particular limitation regarding the degree of attenuation, it may be desired for the average transmittance of at least the light of a wavelength of 564 nm or more to be one-half or less, or even to be one-third or less, compared to the state prior to providing the wavelength filter.

Also, in order to prevent the saturation from changing significantly, light of the wavelengths 477 to 505 nm, for which a color-matching function of r is negative and b and g are regions that are half or less of the peak, may also be attenuated. It may be desired for the range of numerical values of the degree of attenuation to be similar to that described in the preceding paragraphs.

Although there is no particular limitation on the method of adding the wavelength filter, for example, the wavelength filter may be formed by performing a dyeing treatment on the eyeglass lens provided with a processed lens base material, a hard coat film, or the like. Other than this, a coloring material may be selected as the material of the lens base material, and thus the function of the wavelength filter may be included in the lens base material itself. At this time, the lens base material for which the coloring material was selected may also be selected for the above-described predetermined location AP, and the coloring material may be selected for the entire lens base material and the color of the above-described predetermined location AP and the color of the base portion BP may be made different from each other. Also, coating may be performed on the lens base material or the eyeglass lens, similarly to the hard coat film. The transmittance may also be controlled by coating with a reflective coat.

If a coloring treatment is to be performed on the eyeglass lens, the coloring treatment may be performed on at least one of the object-side surface and the eyeball-side surface, or the coloring treatment may be performed on the entire lens base material 2.

The position of adding the wavelength filter may be provided at the convex portion region of condition (1) above, at the convexo-concave region of condition (2) above, and/or at the different refractive index material region of condition (3) above. For example, in the case of condition (1) above, defocusing occurs due to the predetermined location AP, and thus there is a risk that light will be focused on the overfocus side relative to the retina and light will be focused on the underfocus side relative to the retina, and by adding the wavelength filter on the predetermined location AP, it is possible to directly suppress the occurrence of a defect caused by a longitudinal chromatic aberration at a location where such a defect may occur. This means that the amount of light that is defocused at each wavelength due to a longitudinal chromatic aberration can be controlled more reliably.

However, the position at which the wavelength filter is added is not limited to the above-described position. For example, it may be desired that the wavelength filter is added to the entirety of at least one of the eyeball-side surface and the object-side surface of the lens base material or to the entirety of at least one of the eyeball-side surface and the object-side surface of the eyeglass lens. The wavelength filter may also be added to a portion other than the convex portion region, the convexo-concave region, and the different refractive index material region. The wavelength filter may also be added outside of a circular region with a radius of 2.5 to 10.0 mm from the lens center. The wavelength filter may also be added to only a portion below the lens center, such that traffic signs and signals are easier to see.

It is also possible to employ the following aspect. Note that the following aspect may also be employed independently of the above-described "eyeglass lens according to an aspect of the present disclosure". The following aspect can be implemented to have independently the property of reducing impairment of a near-sightedness progression suppression.

"An ophthalmological lens configured to provide a near-sightedness progression suppression effect using a monochromatic aberration of a pencil that is a bundle of rays passing through the ophthalmological lens and passing through a pupil, the ophthalmological lens having a spectral transmittance set such that an average value of a defocus amount (Diopter)×an amount of light focused on an underfocus side relative to a retina is smaller than an average value of a defocus amount (Diopter)×an amount of light focused on an overfocus side relative to the retina."

The above-described aspect is intended to define a relationship between light rays that are focused at positions other than the retina, that is, the defocus degree (value @) toward the overfocus side, which is thought to provide a near-sightedness progression suppression effect, and a defocus degree (value B) toward the underfocus side, which is thought to conversely inhibit the near-sightedness progression suppression effect. Also, the defocus amount (Diopter) can be kept track of by using a known ray tracing method, similarly to the light amount.

It is possible to distinguish between rays that are incident on the multiple convex portion regions in a range with a diameter of 4 mm, and rays that are incident on the base region. Also, as long as three-dimensional coordinates (intersection coordinates) at which rays that are each incident on one of the multiple convex portion regions cross each other can be obtained at other convex portion regions as well, locations at which intersection coordinates are arranged in groups can be considered focus positions A ($A_1$, $A_2$, $A_3$). Note that if a range having a diameter greater than 4 mm is considered, it is possible to understand the overall result of the lens by performing the above-described task for each of the multiple regions.

Through ray tracing processing, the coordinates of the emitted portions of the rays from the lens model that are incident on the respective multiple convex portion regions and the vectors from the emitted portions can be found. In view of this, the average value of the intersection coordinates is obtained using the coordinates and the vectors. For each intersection coordinate, the residual from the average value of the intersection coordinate being small means that the rays are concentrated at locations corresponding to the respective convex portion regions. Based on this idea, the location at which the residual from the average value of the intersection coordinate reaches its minimum (in the present aspect, a location separated by 1/D (defocus amount, in units of Diopters) in the optical axis direction from the peak of the eyeball-side surface (concave surface)) is found.

Hereinafter, a further specific configuration of the eyeglass lens according to one aspect of the present disclosure will be described.

Overall Configuration of Eyeglass Lens

As shown in FIG. 1B, an eyeglass lens 1 has multiple convex portion regions 6 that are aligned regularly in the vicinity of a lens center. These convex portion regions 6 are predetermined locations AP. The portion serving as a base other than the convex portion regions 6 is the base portion BP. The specific configuration of the convex portion region 6 will be described in detail later.

FIG. 2 is a cross-sectional view showing an exemplary configuration of the eyeglass lens shown in FIG. 1B.

As shown in FIG. 2, the eyeglass lens 1 has an object-side surface 3 and an eyeball-side surface 4. Also, the eyeglass lens 1 is constituted by including a lens base material 2, a wavelength filter 7 formed on the convex surface side of the lens base material 2, hard coat films 8 respectively formed on the convex surface side and the concave surface side of the lens base material 2, and reflection prevention films (antireflective (AR) films) 10 that are formed on the outer surfaces of the hard coat films 8. Note that another film may also be further formed in addition to the hard coat films 8 and the reflection prevention films 10 on the eyeglass lens 1.

Lens Base Material

The lens base material 2 is formed using, for example, a heat-setting resin material such as polycarbonate, CR-39, thiourethane, allyl, acryl, and epithio. Among these, polycarbonate may be desired. Note that another resin material according to which a desired refractivity can be obtained may also be selected as the resin material constituting the lens base material 2. A lens base material made of inorganic glass instead of a resin material may also be used.

In one aspect of the present disclosure, multiple convex portion regions 6a are formed on the object-side surface 3 (convex surface) of the lens base material 2 so as to protrude from the surface toward the object. The convex portion regions 6a are each formed by a curved surface with a curvature different from that of the object-side surface 3 of the lens base material 2.

Due to this convex portion region 6a being formed, when in a plan view, convex portion regions 6a, each having an approximately circular shape, are arranged as islands at an equal interval in the radial direction and the circumferential direction around the lens center on the object-side surface 3 of the lens base material 2. The regions 6a are arranged as islands. In other words, the approximately circular convex portion regions 6a are arranged in a state of being spaced apart from each other without being in contact with each other, that is, in a state in which the base portion BP serving as a base is present between the convex portion regions 6a.

Note that multiple convex portion regions 6a may also be formed on the object-side surface 4 (recessed surface) of the lens base material 2. The multiple convex portion regions 6a may also be formed on both surfaces, that is, on the convex surface and on the recessed surface. For convenience of description, hereinafter, a case will be illustrated in which the multiple convex portion regions 6a are formed on the object-side surface 3 (convex surface).

Wavelength Filter

The wavelength filter 7 is formed using, for example, a dye. The wavelength filter 7 can be formed using a method of immersing the lens base material 2 in a wavelength filter chemical solution, which is the dye. The amount of light that is defocused at each wavelength due to a longitudinal chromatic aberration can be controlled by coating with the wavelength filter 7.

Hard Coat Film

The hard coat film 8 is formed using, for example, a thermoplastic resin or a UV-curable resin. The hard coat film 8 can be formed by using a method of immersing the lens base material 2 in a hard coat solution, spin coating, or the like. An improvement in durability of the eyeglass lens 1 is achieved through this coating with the hard coat film 8.

Reflection Prevention Film

The reflection prevention film 10 is formed by, for example, depositing a reflection prevention agent such as $ZrO_2$, $MgF_2$, or $Al_2O_3$ through vacuum deposition. An improvement in the visibility of an image passing through the eyeglass lens 1 is achieved through the coating with the reflection prevention film 10. Note that it is also possible to control the spectral transmittance of the reflection prevention film and to implement the reflection prevention film to be a wavelength filter by controlling the material and film thickness of the reflection prevention film.

Shape of Object-Side Surface

As described above, multiple convex portion regions 6a are formed on the object-side surface 3 of the lens base material 2. Accordingly, when the surface 3 is coated with the hard coat film 8 and the reflection prevention film 10, multiple convex portion regions 6b are formed in conformity with the convex portion regions 6a on the lens base material 2 by the hard coat film 8 and the reflection prevention film 10 as well. In other words, the convex portion regions 6 constituted by the convex portion regions 6a and the convex portion regions 6b are arranged on the object-side surface 3 (protruding surface) of the eyeglass lens 1 so as to protrude from the surface 3 toward the object.

The convex portion regions 6 conform to the convex portion regions 6a of the lens base material 2, and therefore are arranged in an island shape in a state of being aligned at an equal interval in the radial direction and in the circumferential direction around the lens center, that is, being aligned regularly in the vicinity of the lens center, similarly to the convex portion regions 6a.

As another aspect of the present disclosure, it is also possible to form the convex portion regions 6 using the hard coat film 8, the reflection prevention film 10, a metal film such as Cr, and/or another inserted layer, instead of providing the convex portion regions 6a on the lens base material 2, and it is also possible to form the base portion BP in addition to or instead of forming the predetermined locations AP, which are the convex portion regions 6.

Note that as shown in FIG. 1B of the present application, the convex portion regions 6 may also be provided at a location through which the optical axis of the lens center passes, and it is also possible to ensure a region at which the convex portion regions 6 are not provided at a location through which the optical axis passes, as shown in FIG. 1A of the present application.

For example, the convex portion regions 6 are constituted as follows. It may be desired for the diameter of the convex portion region 6 to be about 0.8 to 2.0 mm. It may be desired for the shortest distance between the convex portion regions 6 also to be about 0.8 to 2.0 mm. The protrusion height (protrusion amount) of the convex portion regions 6 is about 0.1 to 10 μm, and it may be desired for this height to be about 0.7 to 0.9 μm. It may be desired for the curvature of the convex portion regions 6 to be a spherical surface with a radius of about 50 to 250 mm, and it may be desired for this radius to be 86 mm. By using this kind of configuration, the refractive power of the convex portion regions 6 is set to be about 2.00 to 5.00 diopters greater than the refractive power of regions in which the convex portion regions 6 are not formed.

Optical Characteristics

With the eyeglass lens 1 having the above-described configuration, the following optical characteristics can be realized due to the convex portion regions 6 being included on the object-side surface 3, and as a result, it is possible to suppress the progression of a refractive error such as near-sightedness of the wearer of the glasses.

FIG. 3 is a schematic cross-sectional view (1) showing a path of light passing through the eyeglass lens shown in FIG. 1B.

As shown in FIG. 3, the light that has entered the region in which the convex portion regions 6 have not been provided on the object-side surface 3 of the eyeglass lens 1, that is, the base portion BP, is emitted from the eyeball-side surface 4 and is focused on a retina 20a of an eyeball 20. That is, in principle, the rays passing through the eyeglass lens 1 are focused on the retina 20a of the wearer of the glasses. In other words, the curvature of the base portion BP of the eyeglass lens 1 is set according to a prescription for the wearer of the glasses, such that a focal point is formed on the retina 20a, which is a predetermined position B.

FIG. 4 is a schematic cross-sectional view (2) showing a path of light passing through the eyeglass lens shown in FIG. 1B.

On the other hand, as shown in FIG. 4, in the eyeglass lens 1, the light that has entered the convex portion regions 6 is emitted from the eyeball-side surface 4, and is thereafter focused at a position A on the overfocus side relative to the retina 20a of the eyeball 20. In other words, the convex portion regions 6 cause light emitted from the eyeball-side surface 4 to converge at the position A on the overfocus side relative to the focal point position B. The focal point positions A are present as positions $A_1, A_2, A_3, \ldots,$ and $A_N$ (N is the total number of convex portion regions 6) according to each of the plurality of convex portion regions 6.

In this manner, in principle, the eyeglass lens 1 causes the rays that enter from the object-side surface 3 to be emitted from the eyeball-side surface 4 and to converge at the predetermined positions B. On the other hand, at the portions at which the convex portion regions 6 are arranged, the eyeglass lens 1 causes the rays to converge at the positions A ($A_1, A_2, A_3, \ldots,$ and $A_N$) on the overfocus side relative to the predetermined positions B.

As a result, the eyeglass lens 1 has a function of converging rays at the positions A on the overfocus side, which is separate from the ray converging function for realizing the prescription of the wearer of the glasses. By including such optical characteristics, the eyeglass lens 1 exhibits a near-sightedness progression suppression effect.

In the method of evaluating the amount of light, the total number of rays when ray tracing is performed in a range with a 4-mm radius at the pupil is obtained. The term "pupil" here means the entrance pupil of an optical system including the spectacle lens and the eye. The total number of rays at the multiple focal point positions A at which the rays that have passed through the multiple convex portions in the predetermined evaluation region converge is obtained, and the total number of rays at the focal point position B on the retina is obtained. If there are focal point positions C on the underfocus side relative to the retina, the total number of rays thereof is also obtained. Then, the total of the number of rays at the focal point positions A, B, and C is subtracted from the total number of rays to obtain the number of stray rays.

The rays that "converge at the focal point positions A" may also be defined by the rays that pass through the image plane including the focal point positions A within a predetermined range (e.g., within 1 arc-minute of the viewing angle) from the focal point positions A. The same definition is applicable to the rays that converge at the focal point positions B. In addition, "number of rays at the focal positions A or B" indicates the number of rays that converge at the focal point position A or B according the definition above. Note that other than the above-described method, a wave motion optical method may also be used.

Method for Manufacturing Eyeglass Lens

A specific example of a method for manufacturing the eyeglass lens 1 will be described.

In the manufacture of the eyeglass lens 1, first, the lens base material 2 is molded using a known molding method, such as cast polymerization. For example, by using a mold having a molding surface equipped with multiple concave portions and performing molding through cast polymerization, the lens base material 2 having the convex portion regions 6 on at least one surface is obtained.

Then, when the lens base material 2 is obtained, next, the wavelength filter 7 is formed on the surface of the lens base material 2. The wavelength filter 7 can be formed by using the method of immersing the lens base material 2 in the wavelength filter chemical solution, or the like.

Next, the hard coat film 8 is deposited on the surface of the lens base material 2. The hard coat film 8 can be formed by using a method of immersing the lens base material 2 in a hard coat solution, spin coating, or the like.

When the hard coat film 8 is deposited, a reflection prevention film 10 is further deposited on the surface of the hard coat film 8. The hard coat film 8 can be formed by depositing a reflection prevention agent through vacuum deposition. The reflection prevention film can also further be implemented as a wavelength filter.

The eyeglass lens 1 which has an object-side surface 3 with multiple convex portion regions 6 that protrude toward the object can be obtained using the manufacturing method of this procedure.

Aspects of Regions Other than Convex Portion Region, Convexo-Concave Region, and Different Refractive Index Material Region For example, a configuration is given in which multiple holes having a circular shape in a plan view are provided as a dot pattern in a film (e.g., a light blocking film; here, a Cr film is illustrated as an example) formed on the hard coat film, or on the lens base material on which the convex portion region, the convexo-concave region, the different refractive index material region, and the like have not been provided, or the like.

FIG. 5 shows a schematic front view and a partial enlarged view of an eyeglass lens of a modified example that includes a light blocking film (e.g., a Cr film) provided with holes in the form of a dot pattern.

Note that it is sufficient to use a known method as the method for providing the holes, and an example thereof is a method in which a chemical agent is applied in a dot pattern to a surface of the lens base material, a hard coat film on the surface, or the like, and the chemical agent is allowed to dry, whereafter a light blocking film is deposited so as to cover the dried chemical agent in the dot pattern, and thereafter the light blocking of the chemical agent is removed by removing the chemical agent, and as a result, holes are formed in a dot pattern in the light blocking film.

The near-sightedness progression suppression effect is provided also by this eyeglass lens. Note that the eyeglass lens is provided with the near-sightedness progression suppression effect because of the effect of diffracting the light by the dot pattern formed in the light blocking film (amplitude diffraction structure).

For example, diffracted light that is not of a zero-th order is collected at locations other than the retina due to the light diffraction effect. In addition, light on the underfocus side is attenuated by providing a wavelength filter, which is one of the features of an aspect of the present disclosure, on the ophthalmological lens.

Accordingly, the amount of light that is defocused at each wavelength can be controlled, and the effect of suppressing the progression of near-sightedness (or of far-sightedness, in such an embodiment as described herein) is prevented from being inhibited.

Note that the diameter 2r of the holes and the pattern width d of the dot pattern shown in FIG. 5 are not particularly limited, as long as their dimensions are such that the above-described light diffraction effect is exhibited.

In view of the above description, the predetermined location AP and the base portion BP may be described as follows in order to encompass a case in which a portion at which a film is present is set as the base portion BP and to encompass content described before the item of the present modified example.

"The ophthalmological lens described above, including: a predetermined location AP; and a base portion BP that is a portion adjacent to the predetermined location AP,
   in which light is focused on a retina and light is focused on a location other than the retina due to the predetermined location AP and the base portion BP."

Note that a film may also be provided in a dot pattern, conversely to providing holes in a dot pattern. That is, conversely, the portions at which the film is present may be set as the predetermined locations AP, and the portion at which the holes are not provided may be set as the base portion BP. The above-described expression is an expression that can correspond also to another modified example.

That is, the ophthalmological lens of the present modified example provides a diffraction phenomenon due to the difference in the states of the films. For this reason, not only a certain region (e.g., regions of holes) contributes to splitting the light, but the film that is formed, and consequently, the overall structure of the ophthalmological lens contribute to splitting the light.

Note that the "difference in the states of the films" in this context includes any of the following: a case in which holes are provided in a light blocking film as in the preceding example; a case in which, conversely, a light blocking film is provided at only locations corresponding to the holes; a case in which a multi-layer film is provided and holes are provided in only a predetermined surface film; and a case in which, conversely, many multi-layer films are set only at predetermined locations.

Ultimately, there is no limitation to an aspect such as the present modified example, the convex portion region, the convexo-concave region, or the different refractive index material region, as long as the ophthalmological lens focuses light on the retina and on locations other than the retina using the predetermined location AP and the base portion BP.

Exhibiting Far-Sightedness Progression Suppression Effect

In the case of an aspect in which the far-sightedness progression suppression effect is exhibited, a corresponding description of each of a number of examples is obtained by replacing "overfocus side" with "underfocus side", replacing "long wavelength" with "short wavelength", and replacing "a long wavelength that exceeds 534 nm" with "a short wavelength that falls below 534 nm" in the description of any of the examples relating to near-sightedness progression suppression above.

An aspect in which this far-sightedness progression suppression effect is exhibited is as follows.

"An ophthalmological lens configured to provide a far-sightedness progression suppression effect using a monochromatic aberration of a pencil that is a bundle of rays passing through the ophthalmological lens and passing through a pupil,
   the ophthalmological lens including a wavelength filter for attenuating light of a short wavelength shorter than a set dominant wavelength."

SUMMARY

Hereinafter, the ophthalmological lens of the present disclosure will be summarized.

One embodiment of the present disclosure is as follows. "An ophthalmological lens configured to provide a near-sightedness progression suppression effect using a monochromatic aberration of a pencil that is a bundle of rays passing through the ophthalmological lens and passing through a pupil,
   the ophthalmological lens including a wavelength filter for attenuating light of a long wavelength longer than a set dominant wavelength."

The invention claimed is:
1. An ophthalmological lens suppressing progression of near-sightedness using a monochromatic aberration of a pencil that is a bundle of rays passing through the ophthalmological lens and passing through a pupil, the ophthalmological lens comprising:
   a wavelength filter for attenuating light of a long wavelength longer than a dominant wavelength in a range of 500 to 585 nm;
   a predetermined location (AP);
   a base portion (BP) that is a portion adjacent to the predetermined location (AP);
   a passing region through which the pencil travels,
   wherein light is focused on a retina as well as a location other than the retina due to the predetermined location (AP) and the base portion (BP), wherein the predetermined location (AP) satisfies at least one of conditions (1) to (3) as follows:
  (1) the predetermined location (AP) includes a convex portion region that protrudes from the base portion (BP) of at least one of an eyeball-side surface and an object-side surface of the ophthalmological lens so as to focus a portion of the pencil on an overfocus side relative to the retina, and more than one of the predetermined locations (AP) are surrounded by the base portion (BP),
  (2) the predetermined location (AP) includes a diffraction structure on at least one of the eyeball-side surface and the object-side surface of the ophthalmological lens so as to focus a part of the pencil on the overfocus side relative to the retina using a diffractive action of the predetermined location (AP), and
  (3) the predetermined location (AP), which is provided on at least one of the eyeball-side surface and the object-side surface of the ophthalmological lens, includes a different-refractive-index-material region having a refractive index different from the refractive index of the base portion (BP), so as to focus a part of the pencil on the overfocus side relative to the retina using a reciprocal action of the predetermined location (AP) and the base portion (BP),
wherein by passing the pencil through the passing region with a diameter of 4 mm, in which both of the predetermined location (AP) and the base portion (BP) are encompassed, a high-order monochromatic aberration having a fourth order or higher is added to the pencil.

2. The ophthalmological lens according to claim 1, wherein
  the wavelength filter is provided on at least one of the convex portion region, the diffraction structure, and the different refractive index material region.

3. The ophthalmological lens according to claim 1, wherein the dominant wavelength is in a range of 532 to 575 nm.

4. The ophthalmological lens according to claim 1, wherein the wavelength filter attenuates light with a wavelength in a range of 564 to 570 nm.

5. The ophthalmological lens according to claim 1, wherein the ophthalmological lens is an eyeglass lens.

6. The ophthalmological lens according to claim 2, wherein the set dominant wavelength is one value in a range of 532 to 575 nm.

7. The ophthalmological lens according to claim 2, wherein the wavelength filter is one value in a range of wavelengths of 564 to 570 nm.

8. The ophthalmological lens according to claim 1, wherein the ophthalmological lens configured to provide a near-sightedness progression suppression effect using a monochromatic aberration of a pencil that is a bundle of rays passing through the ophthalmological lens and passing through a pupil, the ophthalmological lens having a spectral transmittance set such that an average value of a defocus amount (Diopter)×an amount of light focused on an underfocus side relative to a retina is smaller than an average value of a defocus amount (Diopter)×an amount of light focused on an overfocus side relative to the retina.

* * * * *